(12) United States Patent
Finlayson et al.

(10) Patent No.: US 8,488,768 B2
(45) Date of Patent: Jul. 16, 2013

(54) SYSTEM AND METHOD OF PROVIDING A SINGLE SERVICE DESTINATION IN A TELECOMMUNICATIONS NETWORK

(75) Inventors: Piers Daniel Finlayson, Enfield (GB); Christopher John Mairs, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 817 days.

(21) Appl. No.: 12/340,606

(22) Filed: Dec. 19, 2008

(65) Prior Publication Data

US 2010/0034368 A1 Feb. 11, 2010

(30) Foreign Application Priority Data

Aug. 5, 2008 (GB) .................................. 0814350.5
Dec. 2, 2008 (GB) .................................. 0821973.5

(51) Int. Cl.
*H04M 3/42* (2006.01)

(52) U.S. Cl.
USPC ................................ 379/221.02; 379/221.01

(58) Field of Classification Search
USPC .............. 379/211.01, 211.02–211.04, 207.16
See application file for complete search history.

(56) References Cited

U.S. PATENT DOCUMENTS

| 5,841,839 | A | 11/1998 | Fogg et al. |
| 6,718,026 | B1* | 4/2004 | Pershan et al. ........... 379/211.01 |
| 7,023,967 | B1 | 4/2006 | Andersson et al. |
| 7,376,413 | B2* | 5/2008 | Jordan, Jr. ................. 455/412.2 |
| 7,649,987 | B1* | 1/2010 | Contractor ............... 379/221.02 |
| 2005/0111631 | A1 | 5/2005 | Jordan, Jr. |
| 2006/0177025 | A1 | 8/2006 | Frifeldt et al. |

FOREIGN PATENT DOCUMENTS

WO    WO 01 06740    1/2001

* cited by examiner

*Primary Examiner* — Amal Zenati
(74) *Attorney, Agent, or Firm* — Baker Hostetler LLP

(57) ABSTRACT

A method and apparatus for providing a single service destination in a telecommunications network is disclosed. In particular, but not exclusively, disclosed embodiments relate to the provision of a single mailbox for multi-service users having access to a plurality of different telephony services.

27 Claims, 9 Drawing Sheets

SYSTEM AND METHOD OF PROVIDING A SINGLE SERVICE DESTINATION IN A TELECOMMUNICATIONS NETWORK

CROSS-REFERENCE TO RELATED APPLICATIONS

This application claims priority under 35 U.S.C. §119(a) to (1) Great Britain Application No. 0814350.5, filed on Aug. 5, 2008; and (2) Great Britain Application No. 0821973.5, filed on Dec. 2, 2008. The entire disclosure of each of the above-referenced applications is hereby incorporated by reference.

BACKGROUND OF THE INVENTION

1. Field of the Invention

This invention relates to a method and apparatus for providing a single service destination in a telecommunications network. In particular, but not exclusively, the invention relates to the provision of a single mailbox for multi-service users having access to a plurality of different telephony services.

2. Description of the Related Technology

Known voicemail systems allow a calling party to leave a message for a called party when the called party is unable or unwilling to answer the call. If a call is not answered by the called party, the calling party is directed to a local messaging system or a remote messaging centre where the calling party may record a message for subsequent retrieval by the called party. Such systems are known in both fixed and mobile telephone networks and also in data networks such as the Internet.

FIG. 1 shows a prior art telecommunications network. The telecommunications network includes a Public Switched Telephone Network (PSTN) 102 to which a telephone 100 (telephone A) is connected and which is connected to a service provider network 104. Service provider network 104 includes a local telephone exchange switch 110 which serves a telephone 106 (telephone B). The user of telephone B has a voice messaging service provided by the service provider who operates service provider network 104. The voice messaging service is implemented via a messaging centre 108 (MCB) which is connected to local telephone exchange switch 110. Operation of messaging centre 108 is under the control of the service provider of network 104.

FIG. 2 is a flow diagram according to the prior art which illustrates the steps involved in a user of telephone A leaving a voice message for the user of telephone B, for an arrangement in which the user of telephone B has a voice messaging service provided by the service provider who operates network 104 (shown by annotation 200 in FIG. 2).

When telephone A is used to make a call to telephone B, the telephone dialing number for telephone B is dialed. This initiates a call that is routed via PSTN 102 to local telephone exchange switch 110 which serves telephone B located in service provider network 104. The call initiation results in a signaling message (shown by step 2a) traversing PSTN 102 which contains a calling line identifier (CLI) (also referred to as a caller ID) for telephone A (denoted CLI: A) and destination dialing number for telephone B (denoted DN: B). When local telephone exchange switch 110 receives the signaling message of step 2a, it rings telephone B as shown by step 2b.

In this case, the user of telephone B has subscribed to CLI services and the user of telephone A has not withheld their CLI when making the call, so the signaling message of step 2b contains a CLI for telephone A.

If telephone B is not answered and the user of telephone A wishes to leave a voicemail message for the user of telephone B, then after a pre-configured delay, local telephone exchange switch 110 forwards the call to messaging centre 108. The signaling message which is sent to messaging centre 108 (shown by step 2c) contains the originating CLI for the call (denoted CLI: A) and a destination dialing number for messaging centre B (denoted DN: MCB). The signaling message of step 2c also contains a redirecting number, which in this case is the number of the line forwarding the call to messaging centre 108. The redirecting number allows messaging centre 108 to identify in which mailbox to deposit the voicemail message from the user of telephone A: in this case telephone B's mailbox.

FIG. 3 is a flow diagram according to the prior art which illustrates a user of telephone B retrieving a voice message from their mailbox using telephone B. The user of telephone B has a voice messaging service provided by the service provider who operates service provider network 104 (shown by annotation 300 in FIG. 3).

To retrieve their voicemail messages, the user of telephone B calls messaging centre 108, shown by step 3a. This may be done by dialing a short code associated with the messaging centre. A short code may be a three digit short code such as 121, 123 or 901 on UK mobile networks, whereas in US mobile networks, a user may dial their own mobile number from their mobile telephone, which is then forwarded to the messaging centre as their mobile telephone is engaged. Alternatively, the user can dial the full telephone dialing number of messaging centre 108.

The signaling message for step 3a contains a CLI for telephone B (denoted CLI: B) and a destination dialing number for the messaging centre (denoted DN: MCB). Messaging centre 108 checks the CLI of the incoming call, and routes the caller to the appropriate mailbox, i.e. that of the user of telephone B. The user can then either listen to their messages, or, if the system is so configured, may have to enter a Personal Identification Number (PIN) first to prevent unauthorised access to their mailbox.

FIG. 4 is a flow diagram according to the prior art which illustrates a user of telephone B retrieving a voice message from their mailbox. The user of telephone B has a voice messaging service provided by the service provider who operates service provider network 104 (shown by annotation 402 in FIG. 4). In this case, the user retrieves their voice message from a telephone D (see annotation 400) which is different to telephone B.

To retrieve their voicemail messages, the user of telephone B calls messaging centre 108 from telephone D. To retrieve voicemail messages from a telephone different to the telephone B, the user dials the full telephone number of messaging centre 108 that hosts their mailbox which causes a signaling message to be sent to messaging centre 108 in step 4a.

The signaling message for step 4a contains a CLI for telephone D (denoted CLI: D) and a destination dialing number for the messaging centre (denoted DN: MCB). Messaging centre 108 checks the CLI of the incoming call, but does not recognize it as it identifies a telephone foreign to their service, i.e. telephone D. Messaging centre 108 therefore cannot connect the user directly to their voice mailbox. Instead, messaging centre 108 prompts the user to enter the number of the phone which has a mailbox on that messaging centre, i.e. that of telephone B, and then asks for the user's PIN to authorise access.

The above prior art systems which allow voicemail to be left in mailboxes by calling parties are adequate when a user has a single telephony service. However, if a user has more than one telephone service, for example a mobile telephony service and a landline telephony service, then the user has to deal with different mailbox services hosted by each of the different service providers. This can be impractical for the user as they have to coordinate the messages left in their different mailboxes. Further, the user has to deal with different access methods, different access codes and different user interfaces for the different mailbox services, which can lead to an inefficient use of the user's time and may lead to increased costs if each of the mailbox services must be paid for individually.

The above prior art methods for retrieving voicemail from a mailbox have a problem in that, if a user wishes to retrieve mail from their mailbox using a telephone service not provided by the same provider as who provides their mailbox service, then it is either not possible for the user to gain such access, or the user must enter a full telephone dialing number associated with the relevant mailbox service. This can be time consuming for the user, and especially inconvenient if the appropriate number is not readily to hand.

U.S. Pat. No. 7,023,967 relates to a system for sharing voice messaging support which includes a voice messaging system coupled to a wireless network and a wireline network. A mailbox can be shared between telephones on each of the different networks. In order to implement this prior art system, each of the wireline and wireless telephony services must be configured to incorporate the shared mailbox functionality.

It would therefore be desirable to provide improved mailbox services for multi-service users who have access to a plurality of telephony services. A single mailbox for the multiple telephony services would be beneficial, since it would facilitate efficient access methods, both for calling parties leaving messages in the mailbox and for subsequent retrieval of the messages by the multi-service users. Further, it would be desirable to provide such mailbox services with a minimum of reconfiguration and disruption to the existing telephony services and telephony devices.

SUMMARY OF CERTAIN INVENTIVE ASPECTS

In accordance with a first aspect, there is provided a method for routing calls to a single service destination for multi-service users in a telecommunications network, each of the multi-service users having access to a plurality of telephony services including a first telephony service and a second, different telephony service, the method comprising the steps of:

receiving an unanswered call directed to a first telephony party identifier associated with the first telephony service for a user;

altering first signaling information for the received unanswered call so as to modify destination information therein, the modified destination information for the call comprising a telephony party identifier associated with the single service destination;

adding second signaling information for the received unanswered call so as to add telephony party identifier information therein, the added information for the call comprising a second telephony party identifier, different to said first telephony party identifier, associated with the second telephony service for the user; and routing the received unanswered call on the basis of the altered first signaling information, whereby to provide call completion to the single destination service for the unanswered call.

Hence, embodiments provide a single service destination to multi-service users having multiple telephone services. Unanswered calls to any of a multi-service user's telephones can all be routed to a single service destination where the multi-service user can access data for multiple services together, rather than having to access multiple service destinations in a disparate and uncoordinated fashion.

Advantageously, the telephony service provider who provides the single service destination need not change any settings in or reconfigure their network in order to support the single service destination. Further, the multi-service user need not change any settings on or reconfigure the telephony device they use for the second telephony service, nor reconfigure their existing services. Certain embodiments can therefore be seamlessly integrated into the existing telecommunications system with a minimum of disruption.

By use of certain embodiments disclosed herein, the look and feel that a multi-service user experiences via their second telephony service will remain unchanged. For example, in the case of the single service destination comprising a mailbox service, when a multi-service user receives a message in their mailbox from either of their telephony services, a waiting indication can be displayed on the telephony device associated with their second telephony service. In the case of the first telephony service being a wireline telephony service and the second telephony service being a wireless telephony service, the waiting indication might be the same message indication icon that previously appeared for messages left directly via their second telephony service, even though no such message waiting indication was previously available via their wireline telephony service. In the case of telephones which are capable of providing graphical user interfaces for voicemail, for example Apple's iPhone™, such built-in visual voicemail applications can be used to access all voicemail messages, including those from their wireline telephony service (which may be their home analogue line, their business line, or both).

Certain embodiments disclosed herein may comprise receiving the routed unanswered call at the single service destination; and identifying that the added telephony party identifier information for the call comprises the telephony party identifier associated with the second telephony service for the user, wherein the call completion to the single service destination for the user is carried out on the basis of the identification. Hence, data fields containing redirection information for unanswered calls can be exploited to convince a messaging centre that an unanswered call should be completed to a mailbox service that it hosts, despite the call being initially directed to a different telephony service from the telephony service which provides the mailbox service.

According to one arrangement, the first telephony service is provided by a first telephony service provider and the second telephony service is provided by a second, different service provider. Hence, the service can be used to provide a single service destination for multi-service users who have telephony services provided by more than one telephony service provider, for example a wireline telephony service provided by one telephony service provider and a wireless telephony service provided by another telephony service provider.

According to another arrangement, the first telephony service and the second telephony service are provided by the same telephony service provider. Hence, certain disclosed embodiments are also applicable to multi-service users who have more than one telephony service provided by a single telephony service provider. For example, if a single telephony service provider offers two different phone services such as a landline telephony service via a PSTN and a VoIP telephony service via the internet, by using the presently disclosed embodiments, a multi-service user can have a single service destination via both of these telephony services. At least one embodiment can be applied to the case where the multi-service user has a single mailbox, say on their landline telephony service, and the VoIP telephony service is able to use the landline telephony service's mailbox (or vice versa).

Further, the one or more embodiments could be applied to a telecommunications system which only has one telephony service provider with a single messaging centre. Here, a first telephone line has an associated mailbox on the message centre and a second telephone line does not, but by using at least one of the presently disclosed embodiments the telephone line is able to use the mailbox associated with the first telephone line.

In certain embodiments, the single service destination is provided to the multi-service user by the second telephony service provider. The multi-service user hence retains the service destination provided to them via their second telephony service and all unanswered calls to both of the user's telephony services will be routed there. Conveniently, the multi-service user is able to use the service destination user interface provided via the second telephony service to access all data in their single service destination, whether these data were originated from their first or their second telephony service. If the first telephony service is a landline telephony service and the second telephony service is a mobile telephony service, then given that mobile telephony services will tend to provide more feature-rich user interfaces, the multi-service user has an improved user experience overall.

In some embodiments, the unanswered call is received at a first network entity associated with the first telephony service and the unanswered call is routed to a second network entity associated with the second telephony service, the second network entity being arranged to provide the single service destination. Hence, embodiments can be configured primarily in the network provided by the first service provider, without any requirement for reconfiguration of the network or services provided by the second service provider.

According to certain embodiments disclosed herein, the first telephony service and the second telephony service comprise one or more of: a wireline telephony service, a wireless telephony service, and a Voice over Internet Protocol (VoIP) telephone service. Hence, a number of different telephony services can be integrated to provide a single mailbox service.

In certain embodiments disclosed herein, the telecommunications system comprises a store containing: a plurality of telephony party identifiers associated with the first telephony service for multi-service users; a plurality of telephony party identifiers associated with the second telephony service for multi-service users; and a plurality of telephony party identifiers associated with single service destinations provided by the second telephony service provider, wherein the method further comprises accessing the store in order to retrieve the telephony party identifier associated with the single service destination and the telephony party identifier associated with the second telephony service, so as to alter the first signaling information and add the second signaling information. Hence, data relating to the different telephony services for multi-service users and their mailbox services can be maintained and referred to when unanswered calls are received via the first telephony service for routing to the mailbox service provided via the second telephony service.

In certain embodiments disclosed herein, the accessing of the store may comprise accessing data in a database held remote from said multi-service users. Hence, data relating to different telephony services for multi-service users and their mailbox services can be held centrally for a number of multi-service users.

In one specific arrangement, the telephony party identifiers comprise one or more of: a calling party identifier, a network node identifier, a Voice over Internet Protocol (VoIP) identifier, and a Session Initiation Protocol (SIP) identifier. Hence, the at least one embodiment is applicable to a variety of telephony services using a variety of different data formats and protocols.

In yet another arrangement, the single service destination for the user is accessible by the user via the first telephony service and via the second telephony service. Hence, arrangements so configured mean that even though the multi-service user has a single mailbox, they may access the mailbox from either of their telephony devices which is desirable if access from one or the other device is inconvenient at a certain time.

In certain embodiments disclosed herein, the added second signaling information is added to a redirection information field in signaling information for the call. Hence, a redirection information field for the call can be analyzed at the single service destination in order to determine which multi-service user's single service destination the call is for.

Certain embodiments disclosed herein may comprise intercepting an access call to the single service destination via the first telephony service; and altering third signaling information in the access call from the first telephony service so as to modify caller identification information therein, the modified caller identification information comprising caller identification information for the user associated with the second telephony service. Hence, once the system has been employed to route calls to the single mailboxes of multi-service users, those users may access their mailboxes via either of their telephony services. If a multi-service user wishes to access their mailbox via a telephony service other than the telephony service with which their mailbox service is hosted, the access call can be intercepted and caller identification information modified to prevent rejection of the access call at the messaging centre.

Certain embodiments disclosed herein may comprise altering fourth signaling information in the access call from the first telephony service so as to modify destination information therein, the modified destination information for the access call comprising a telephony party identifier associated with the single service destination. Hence, when a multi-service user accesses their single service destination via the telephony service other than the telephony service at which their single service destination is hosted, the access call can be intercepted and destination information modified to ensure the access call is routed to the correct destination.

In certain embodiments disclosed herein, the destination information before the modification of the access call comprises a short code associated with the single service destination and the destination information after the modification comprises a telephone dialing number for a node responsible for providing the single service destination. Hence, dialing of short codes by multi-service users to access their services is supported, even via their first telephony services.

Certain embodiments disclosed herein may comprise adding fifth signaling information to a redirection field in signaling information for said access call, said fifth signaling information comprising said second telephony party identifier. Hence, when an access call is intercepted, redirection information can be added to signaling information for the access call which includes a telephony party identifier associated with the second telephony service for the user and thus avoid rejection of the access call at the messaging centre.

In certain embodiments disclosed herein, the single service destination comprises a mailbox service. Hence, at least some embodiments may be used for messaging systems to provide a single mailbox for multi-service users, for example a voicemail or videomail mailbox.

Embodiments may comprise a plurality of users having access to the first telephony service via a shared telephony device, the plurality of users comprising the multi-service user, the method comprising receiving user selection data indicating a selection of the multi-service user from the plurality of users, and wherein the altering of the first signal information, the adding of the second signal information and the routing are carried out in response to the receipt of the user selection data. Hence, a calling party can select a called party whom they wish to leave a message for from a number of users who have access to a shared telephony device. This may for example be implemented through appropriate menu choices on an Interactive Voice Response (IVR) interface provided for calls to the shared telephony device. If the calling party selects a multi-service user, then the call can be processed according to one or more embodiments such that the calling party can leave a message at the single service destination for the multi-service user. If the calling party chooses to leave a message for a user who is not a multi-service user, then a conventional messaging system may be utilized, for example a voicemail service provided locally via the shared telephony device.

Other embodiments disclosed herein may comprise a plurality of users having access to the first telephony service via a shared telephony device, the plurality of users comprising a multi-service user, wherein calls directed to a first telephony party identifier associated with the first telephony service cause the shared telephony device to alert with a first alerting indicator, wherein calls directed to a third telephony party identifier associated with the first telephony service cause the shared telephony device to alert with a second, different, alerting indicator, and wherein the received unanswered call directed to the first telephony party identifier associated with the first telephony service for the multi-service user is received in response to a call to the shared telephony device alerting using the first alerting indicator not being answered. Hence, calls to multi-service users can be distinguished from calls to non multi-service users by employing distinctive audible or visual alerting indicators. This may involve use of different ringing patterns where calls directed to the first and third telephony party identifiers both cause the shared telephony device to ring, but with ringing alerts which sound different from each other. This allows different users to distinguish which calls are for them and which are for other users, such as in 'Teen Line' telephony services. Alternatively, or in combination, different colored lights or other visual indicators on the shared telephony device or associated equipment may be used to provide a similar effect. If a call to a multi-service user is not answered, then the call can be processed according to one or more embodiments such that the calling party can leave a message at the single service destination for the multi-service user.

In accordance with another aspect, there is provided a method for retrieving messages from a single mailbox provided to a multi-service user in a telecommunications network, the multi-service user having access to a plurality of telephony services including a first telephony service and a second, different, and to a mailbox service comprising a mailbox for storing one or more messages for the user, the mailbox service being provided by the provider of the second telephony service, the method comprising the steps of:

receiving a message retrieval request message, the message retrieval request message being received from a telephony device associated with the first telephony service, the message retrieval request message comprising caller identification information identifying the user in the first telephony service;

altering first signaling information in the message retrieval request message so as to modify caller identification information therein, the modified caller identification information comprising caller identification information identifying the user in the second telephony service; and routing the message retrieval request message containing the altered first signaling information to a network node responsible for providing the mailbox service to the user, whereby to provide message retrieval from the mailbox by the network node in response to receipt of the message retrieval request message at the network node.

Hence, embodiments allow multi-service users having access to multiple telephone services to retrieve messages from a single mailbox. Multi-service users may access their single mailbox via either of their telephony services. If a multi-service user accesses their single mailbox via a telephony service different to the one which provides their mailbox service, caller identification information can be modified to ensure that the messaging centre recognizes the source of the access as a telephony device associated with a telephony service provided by the same service provider. In this way, multi-service users can access all of their messages in a unified manner, regardless of whether the messages were received via the first or second telephony service or a mixture of both.

Embodiments disclosed herein may comprise, at the network node, identifying that the modified caller identification information associated with the message retrieval request message comprises caller identification information identifying the user in the second telephony service, wherein the message retrieval from the mailbox service is provided on the basis of the identification. The messaging centre may only grant access for a calling party to a mailbox if it recognizes the line identified as the source of the access call; in this way caller identification information in the access call can be modified to a form which will be accepted by the messaging centre and hence prevent the call being rejected by the messaging centre.

Alternatively, if the messaging centre does not recognize the line identified as the source of the call, the messaging centre may prompt for the "mailbox number" (e.g. the telephone dialing number of the line with a mailbox on this system) and then prompt for a PIN. In such a case, the process is simplified as the message centre will recognize the caller identification information without the inconvenience to the multi-service user of having to enter it in themselves.

If a multi-service user dials their own telephony party identification number (such as his telephone dialing number) from any telephone, once the multi-service user is transferred to the voicemail system (and is in the process of being asked to leave a message) he can often press a key (such as "*") to escape this and then enter his PIN to access his mailbox. Again, such a process is simplified as the messaging centre will recognize the caller identification information.

Certain embodiments may comprise adding second signaling information to a redirection field in signaling information in the message retrieval request message, the second signaling information comprising a telephony party identifier identifying the user in the second telephony service, at said network node, further identifying that the second signaling information added to the message retrieval request message comprises the telephony party identifier identifying the user in the second telephony service, wherein the message retrieval from the mailbox service is provided on the basis of the further identification. Hence, if a multi-service user accesses their single mailbox via a telephony service different to the one which provides their mailbox service, signaling information for the access call can be modified to ensure that the messaging centre recognizes redirection information for the source of the access call as being associated with a telephony service provided by the same service provider.

In another arrangement, the first telephony service is provided by a first telephony service provider and said second telephony service is provided by a second, different service provider. Hence, the system can be used to provide a single mailbox for multi-service users who have telephony services provided by more than one telephony service provider, In another arrangement, the first telephony service and the second telephony service are provided by the same telephony service provider. Hence, at least one embodiment is applicable to multi-service users who have more than one telephony service provided by a single telephony service provider.

Certain embodiments may comprise altering second signaling information in the message retrieval request message so as to modify destination information therein from a short code associated with the mailbox service to a telephone dialing number for the network node, wherein the routing is carried out on the basis of the altered second signaling information. Hence, embodiments allow a multi-service user to access their mailbox by dialing a short code via their first telephony service instead of having to use the full telephone dialing number for the messaging centre in the second telephony service provider network.

In accordance with a third aspect, there is provided apparatus adapted to perform the method of the first and second aspects.

In accordance with a fourth aspect, there is provided a computer program product comprising a computer-readable medium having computer readable instructions recorded thereon, the computer readable instructions being operative, when performed by a computerized device, to cause the computerized device to perform the method of the first and second aspects discussed above. The computer program product can be implemented as a suite of products or software components adapted to run on a network node or be distributed over a system of network nodes.

Further features and advantages of the embodiment disclosed herein will become apparent from the following description of certain inventive embodiments, given by way of example only, which is made with reference to the accompanying drawings.

DETAILED DESCRIPTION OF CERTAIN INVENTIVE EMBODIMENTS

Figure 5:
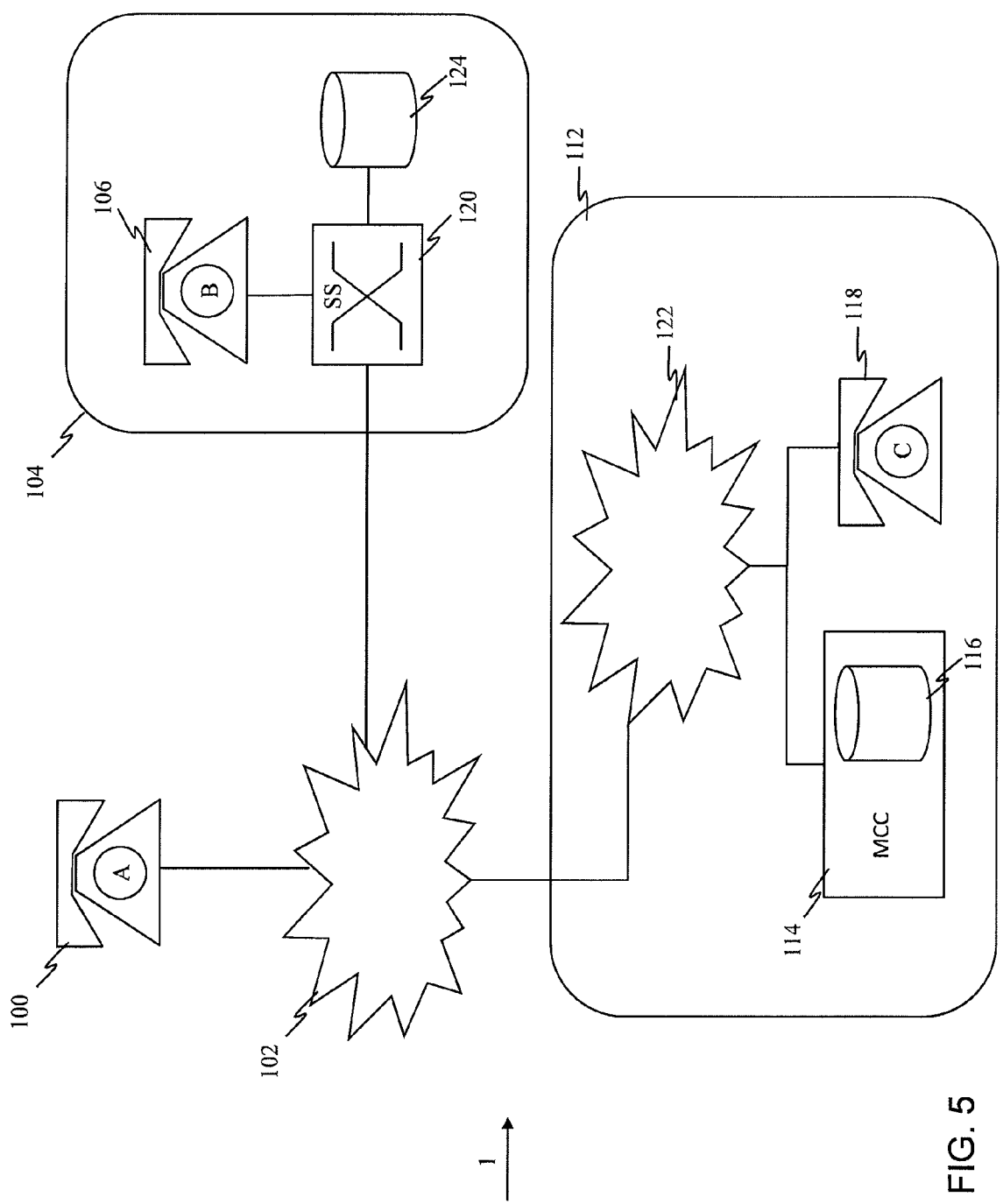
FIG. 5 is a schematic system diagram according to one or more embodiments.

FIG. 5 shows a telecommunications network 1 according to one or more embodiments. Telecommunications network 1 includes a PSTN 102 to which a telephone 100 (denoted telephone A) is connected and which is connected to a first service provider network 104. First service provider network 104 includes a local telephone exchange switch 120 which serves a telephone 106 (denoted telephone B). Local telephone exchange switch 120 has access to a database 124 located either integral thereto or remotely therefrom.

Telecommunications network 1 also includes a second service provider network 112 to which a telephone 118 (telephone C) is connected. Second service provider network 112 includes a messaging centre 114 (denoted MCC). Second service provider network 112 interfaces with PSTN 102 via one or more local telephone exchange switches and/or gateways 122, the operation of which is known to one skilled in the art and will not be described in detail herein.

Local telephone exchange switch 120 provides the main data processing function of embodiments of the invention and is implemented as a network entity within service provider network 104. Local telephone exchange switch 120 may be referred to as a media gateway controller, service platform, call agent or softswitch and may perform other functions typically associated with such entities. The term 'softswitch' is used hereinafter to refer to local telephone exchange switch 120 (denoted 'SS' in FIG. 5). One or more media and/or signaling gateways (not shown) may interface between PSTN 102, service provider network 104 and further service provider network 112 and may be controlled by softswitch 120, or their function may be combined into softswitch 120 itself As well as conventionally providing the architecture for enabling conversion between both media data and signaling protocols via one or more media gateways and signaling gateways, softswitch 120 may conventionally provide call processing intelligence for use in the selection of processes that can be applied to a call; routing for a call within a network based on signaling and subscriber database information; the ability to transfer control of a call to another network element and management functions such as provisioning, and fault detection and billing. For ease of explanation, it is hereafter assumed that softswitch 120 is one network entity, although in practice it may comprise a distributed set of such entities.

In embodiments of the invention, a multi-service user has subscriptions enabling them to make calls from and receive calls at both telephone B and telephone C. Telephone B may for example be a landline telephone and telephone C may be a mobile telephone, or vice versa. Alternatively, telephone B may be a landline telephone such as a home telephone and telephone C may also be a landline telephone, but for an office or other fixed location remote to the multi-service user's office. Further alternatively, both telephone B and telephone C may be mobile telephones with telephony services operated by different service providers. As a further alternative, one or the other or both of telephones B and C may be telephones associated with VoIP or SIP services. In any one of the arrangements it is to be understood that the telephony services for telephone B and telephone C are different telephony services, either provided by the same or different service providers, or the same telephony services operated by different telephony service providers.

The multi-service user of telephones B and C has a single messaging service provided by the service provider who operates second service provider network 112. The messaging service may be a voice and/or video messaging service and is implemented via messaging centre 114 (denoted MCC) which is under the control of the service provider responsible for providing second service provider network 112. The messaging service includes a mailbox where messages for each user (or group of users) are stored.

Embodiments of the invention provide methods and apparatus by which a multi-service user of telephones B and C may have arranged for unanswered calls directed to either of telephones B and C to be routed to a single mailbox provided at messaging centre MCC 114. When a call directed to a telephony party identifier (such as a telephone dialing number or SIP identifier) associated with the telephony service provided via telephone B is unanswered for a pre-configured amount of time or number of rings, softswitch 120 arranges for the calling party to leave a message at the multi-service user's mailbox at messaging centre MCC 114.

This is achieved by softswitch 120 altering first signaling information for the unanswered call by modifying destination information contained in its signaling information. The modified destination information includes a telephony party identifier associated with the mailbox service provided to the multi-service user via messaging centre MCC 114, for example in the form of a telephone dialing number, SIP or VoIP identifier, or other such network identifier for messaging centre MCC 114.

Softswitch 120 also adds second signaling information for the unanswered call by adding telephony party identifier information into the signaling information. The added telephony party identifier information includes a second telephony party identifier, different to the first telephony party identifier, associated with the telephony service provided via telephone C, for example in the form of a telephone dialing number, SIP or VoIP identifier, or other such device identifier for telephone C. Softswitch 120 then forwards on the call containing the first altered signaling information and the second added signaling information into telecommunications network 1. The forwarded call is then routed on the basis of the modified destination information to its destination, i.e. messaging centre MCC, via PSTN 102 and switches/gateways 122.

When the forwarded unanswered call arrives at messaging centre MCC, signaling information for the call is analyzed in order to determine which mailbox service the call should be delivered to, i.e. which multi-service user's mailbox the call should be completed to. The call is completed to the correct multi-service user's mailbox on the basis of the second signaling information in the call, which in this case identifies a telephony party identifier associated with the telephony service provided via telephone C. Once the call is completed to the multi-service user's mailbox at messaging centre MCC 114, the calling party may leave a message which is stored for later retrieval by the multi-service user. The message may be stored in a database 116 located either locally to or remote from messaging centre MCC 114. Messaging centre MCC 114 may access data stored in database 116 when determining which multi-service user's mailbox a call should be completed to, for example querying data associating different mailboxes on the basis of different telephony party identifiers.

Softswitch 120 has access to a database 124 which is used to store telephony party identifiers associated with each of the multi-service user's telephony services and the mailbox services provided at messaging centre MCC. Softswitch 120 may access data stored in database 124 when altering signaling information for unanswered calls for multi-service users. When softswitch 120 receives such a call it searches database 124 for telephony party identifiers corresponding with those contained in the call and retrieves telephony party identifiers from corresponding entries in the database for use in altering and adding the signaling information for the call.

Figure 6:
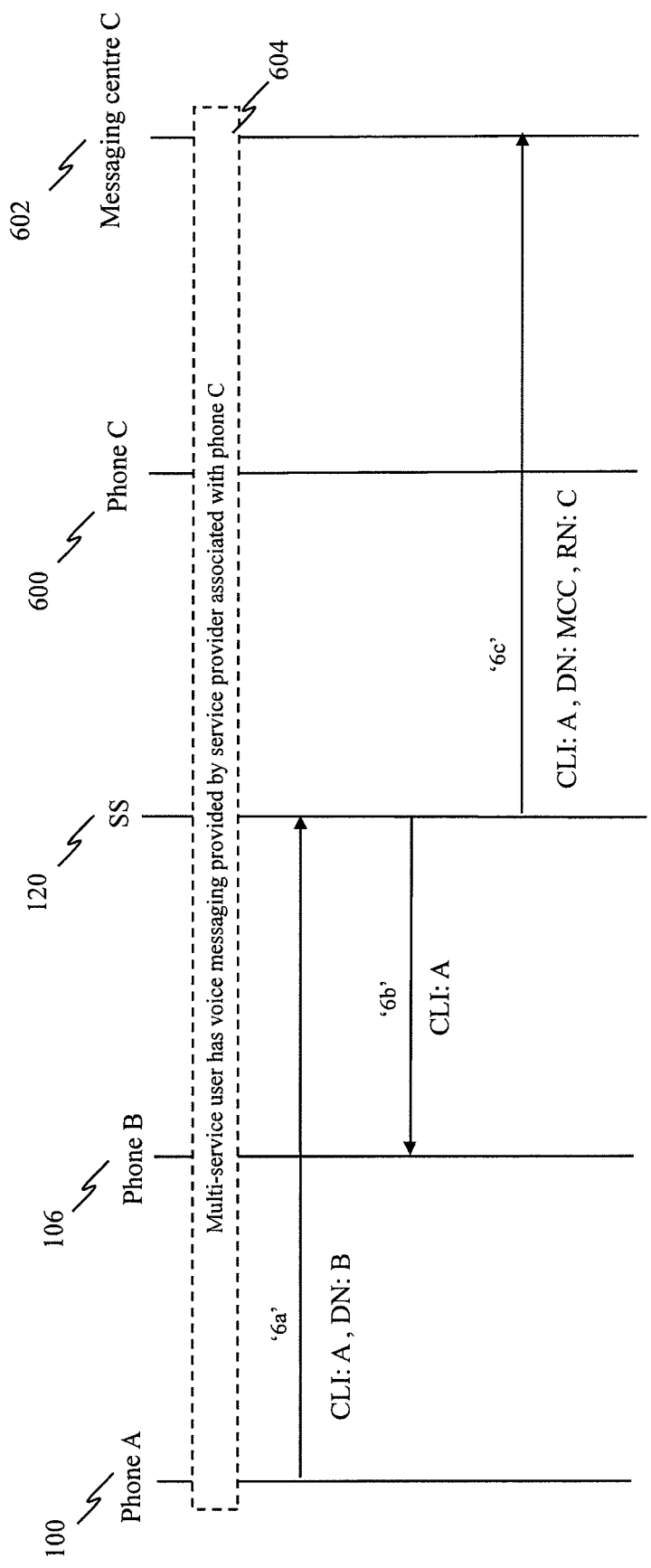
FIG. 6 is a flow diagram according to one or more embodiments.

FIG. 6 is a flow diagram showing a calling party leaving a message for a multi-service user according to an embodiment of the present invention. The multi-service user of telephone B has a voice messaging service provided by the service provider who operates first service provider network 112, i.e. the service provider associated with telephone C (see annotation 604 in FIG. 6).

When telephone A is used to make a call to telephone B, the telephone dialing number for telephone B is dialed. This initiates a call that is routed via PSTN 102 to softswitch 120 which serves telephone B located in first service provider network 104. The call initiation results in a signaling message (shown by step 6a) traversing PSTN 102, the signaling message containing a CLI for telephone A (denoted CLI: A) and destination dialing number for telephone B (denoted DN: B).

When softswitch 120 receives the signaling message of step 6a, it rings telephone B as shown by step 6b. In this case, the multi-service user of telephone B has subscribed to CLI services and the user of telephone A did not withhold their CLI when making the call, so that the signaling message of step 6b contains a CLI for telephone A. Alternatively, the signaling message of step 6b need not contain any CLI information.

If telephone B is not answered and the user of telephone A wishes to leave a voicemail message for the multi-service user of telephone B, then after a pre-configured delay, softswitch 120 proceeds to alter and add signaling information for the call. The destination information for the call is altered to that of messaging centre MCC 114 (denoted DN: MCC) as this is where the multi-service user's mailbox service is hosted. The CLI for the call is left unchanged, i.e. identifying telephone A (denoted CLI: A). Softswitch 120 also adds telephony party information in the call to identify telephone C (denoted RN: C), in this case the added telephony party information is redirection information identifying telephone C. This means that the number or identifier of the line forwarding the call will appear to relate to telephone C rather than telephone B.

Softswitch 120 then forwards the call containing the altered and added signaling information into telecommunications network 1 which results in the signaling message of 6c being routed from softswitch 120 to the destination identified in the altered signaling information i.e. messaging centre MCC 114. The added signaling information contained in the message of step 6c allows messaging centre MCC 114 to identify which mailbox to deposit the voicemail message from the user of telephone A in; in this case the mailbox corresponding to telephone C.

It is to be noted that if the added signaling information in the call had not been added by softswitch 120 to identify telephone C instead of telephone B, then call completion to a mailbox hosted by messaging centre C may not have been possible as messaging centre MCC 114 does not provide a mailbox service for telephone B.

Figure 1:
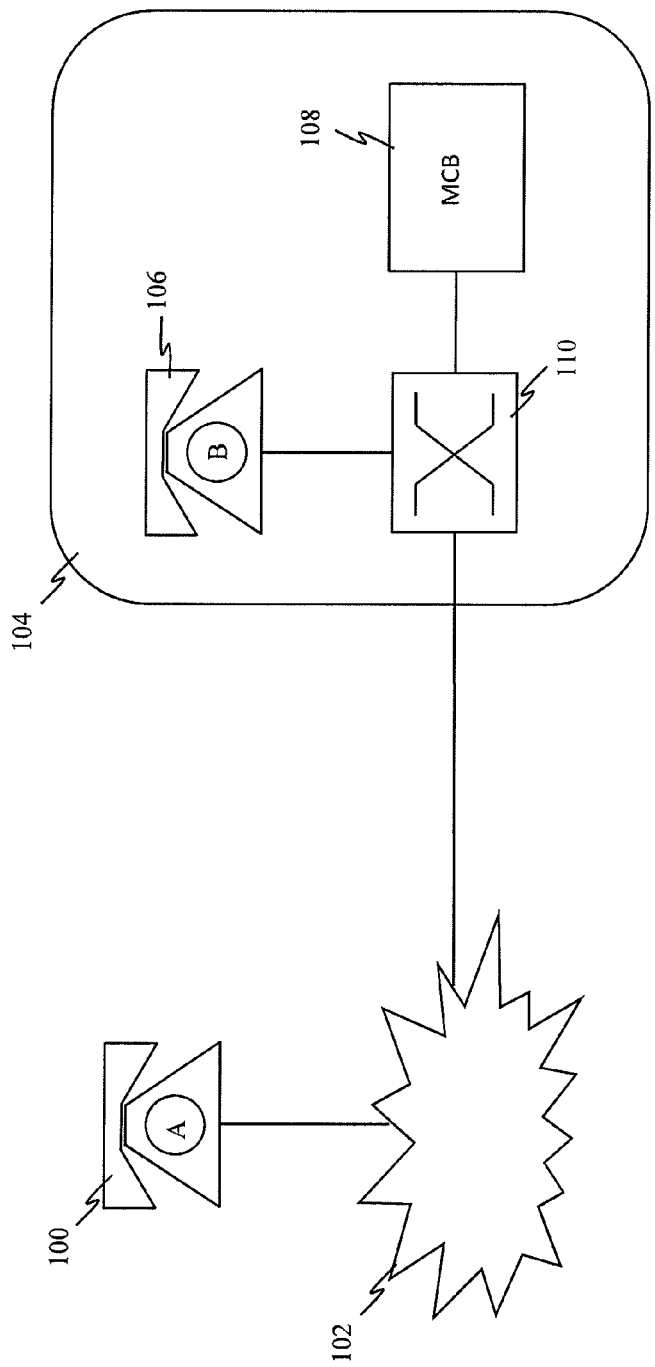
FIG. 1 is a schematic system diagram according to the prior art.
Figure 2:
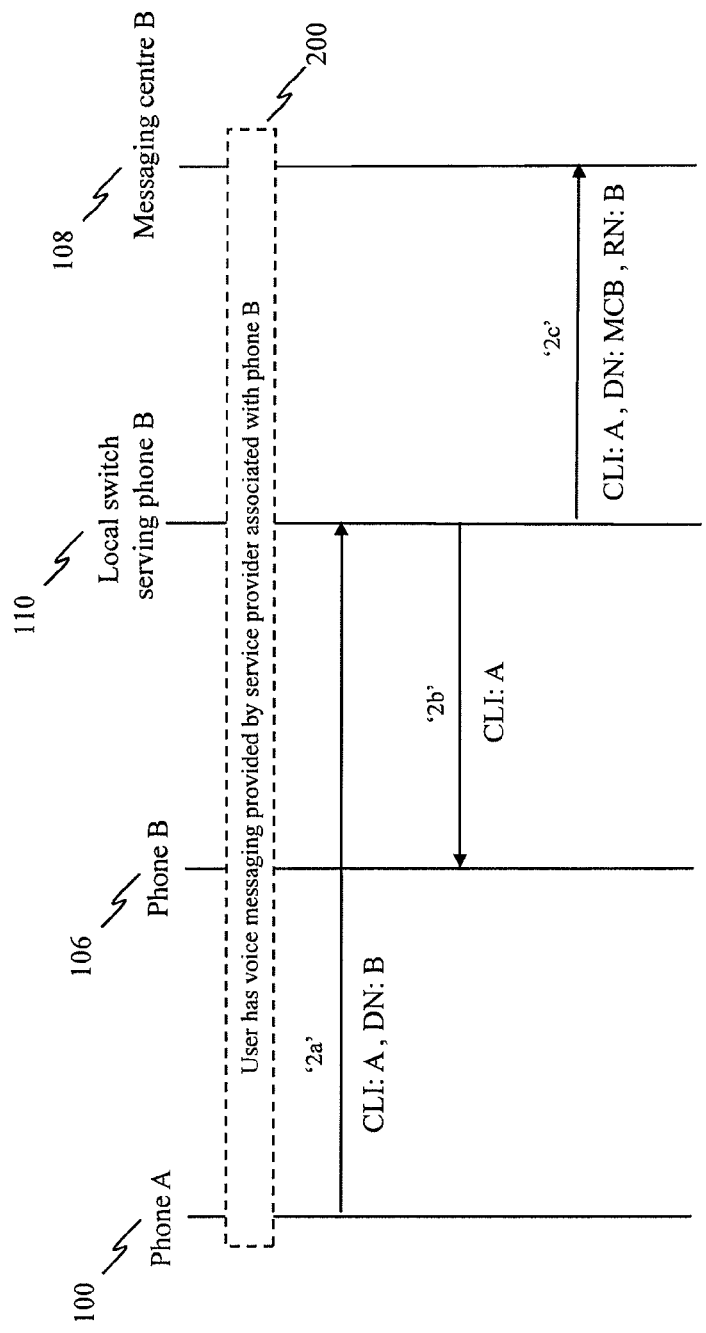
FIG. 2 is a flow diagram according to the prior art.

A calling party may also leave a message for a multi-service user by directing a call to a telephony party identifier associated with the telephony service provided via telephone C. If the call is unanswered for a pre-configured time or number of rings then a local telephone exchange switch (not shown specifically, but contained in annotation 122) will route the call to the multi-service user's mailbox provided at messaging centre MCC 14 in a similar manner to that described for FIG. 2 above except that telephone B is replaced by telephone C and messaging centre B is replaced by messaging centre MCC 114.

Turning now to aspects of the information that is required to perform modification of the destination information and addition of the telephony party information, in some embodiments, softswitch 120 is pre-configured with the telephony party identifier of telephone C, data for such being stored in database 124. A similar procedure is carried out for telephone B. The telephony party identifiers for both telephones B and C are then associated together, along with a telephony party identifier for messaging centre MCC 114 and stored in conjunction in database 124.

There are a number of alternative mechanisms by which calls may be routed from softswitch 120 to messaging centre MCC 114 in telecommunications network 1.

In some embodiments, softswitch 120 dynamically looks up the telephony party identifier for telephone C in a remote database which identifies which service provider or operator provides a telephone service to telephone C. Softswitch will then also dynamically look up in another database the telephony party identifier for messaging centre MCC which services telephone C.

Alternatively, softswitch 120 may query service provider network 112 directly for contact details for the messaging centre which services telephone C.

In addition to providing a means for voicemail messages to be left when a call is unanswered on either of two telephony services to be stored in a single mailbox, certain embodiments provide methods and apparatus by which a multi-service user may access their mailbox to retrieve messages which have been left for them by one or more calling parties. These embodiments can be implemented using the various entities depicted in FIG. 5 as will now be explained.

When a multi-service user wishes to access their mailbox service to retrieve messages stored in their mailbox, they may access the mailbox either using telephone B or telephone C.

Figure 3:
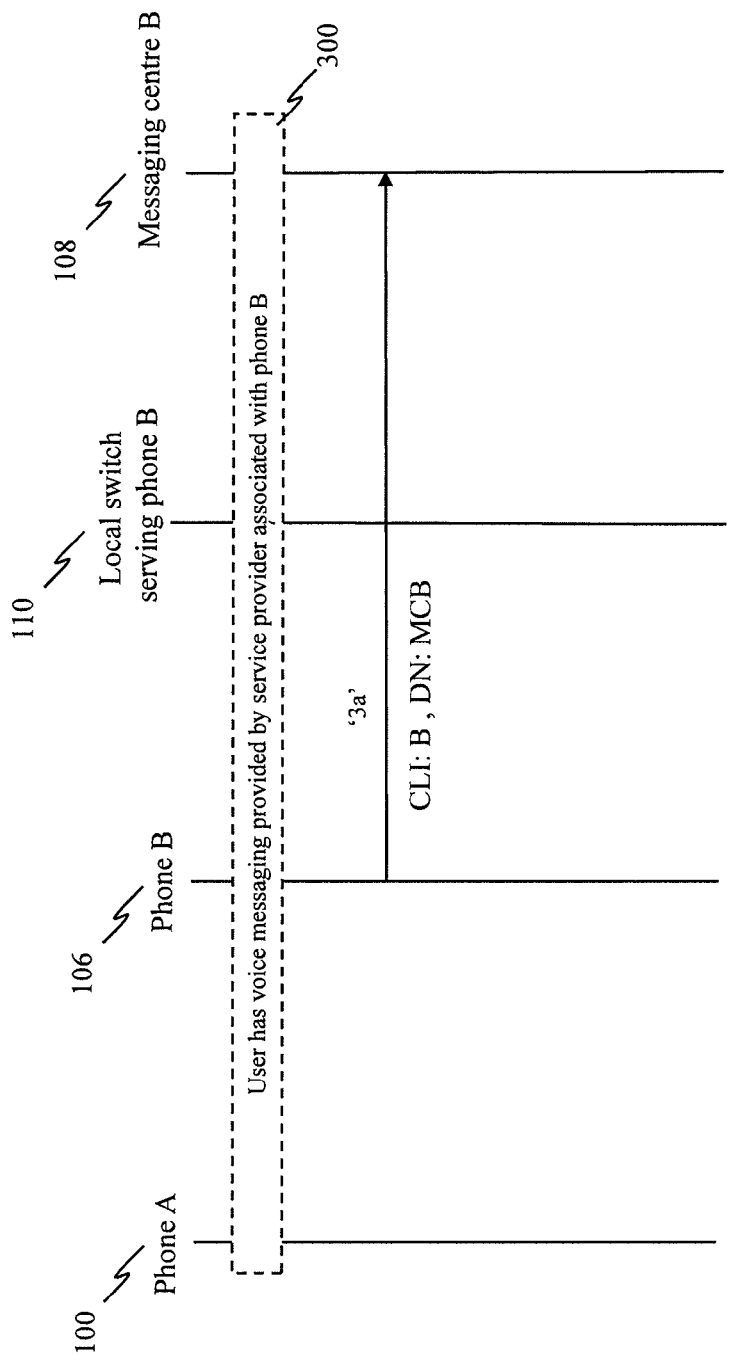
FIG. 3 is a flow diagram according to the prior art.
Figure 4:
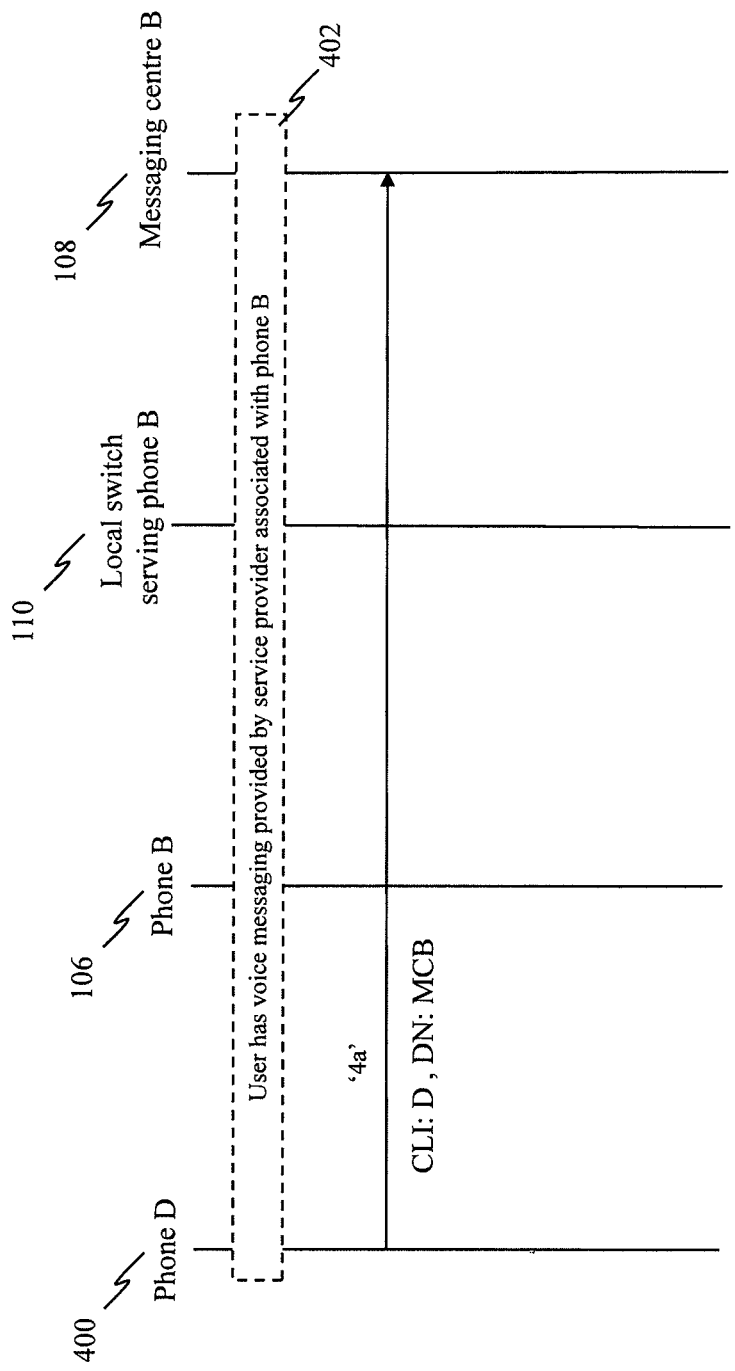
FIG. 4 is a flow diagram according to the prior art.

A multi-service user of telephones B and C may access their mailbox provided at messaging centre MCC using telephone C in a similar manner to that described for FIG. 3 above except that telephone B is replaced by telephone C, messaging centre B is replaced by messaging centre MCC and the local switch serving telephone C will be located in service provider network 112 (not shown specifically, but contained in annotation 122).

Figure 7:
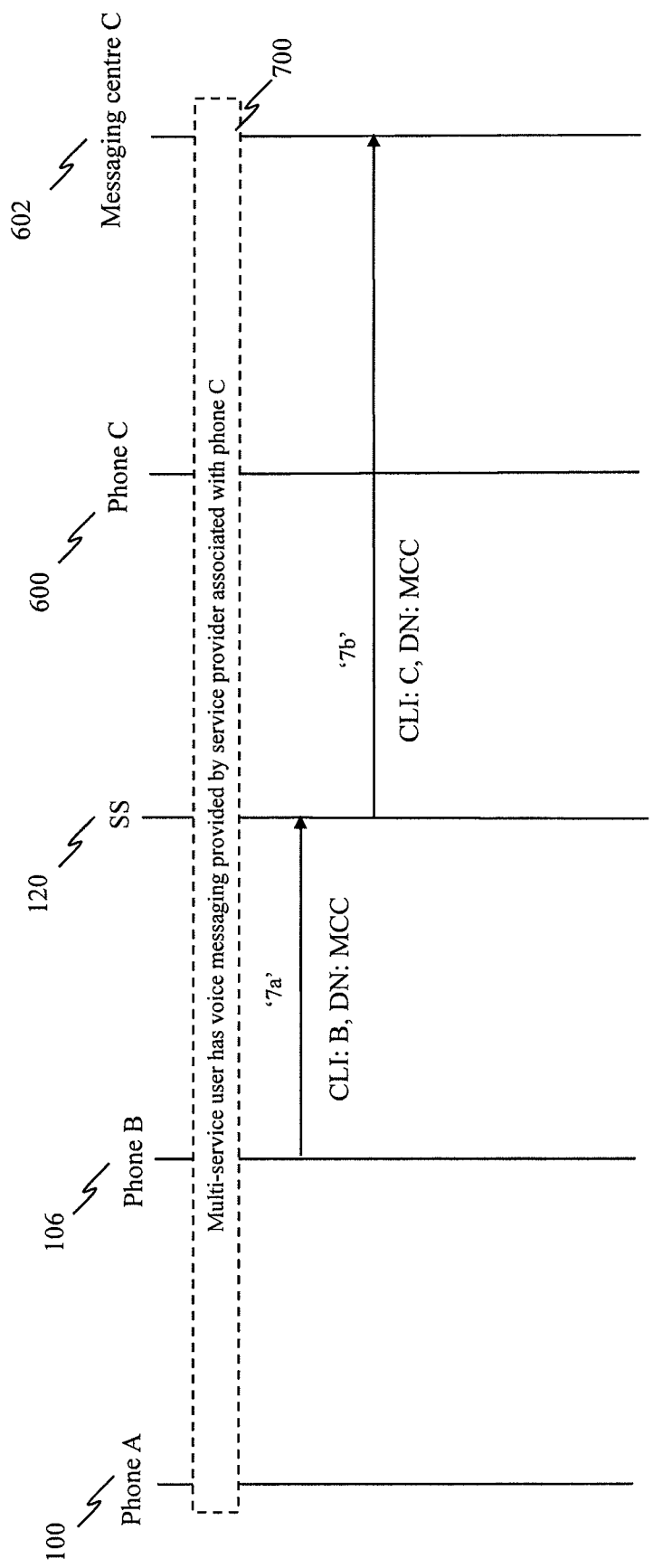
FIG. 7 is a flow diagram according to one or more embodiments.

FIG. 7 is a flow diagram according to an embodiment of the message retrieval aspect which illustrates a multi-service user of telephones B and C using telephone B to retrieve a voice message from their mailbox provided at messaging centre MCC 114.

In a first arrangement, to retrieve their voicemail messages, the multi-service user uses telephone B to initiate a call to messaging centre MCC 114, shown by step 7a. In this embodiment, the multi-service user dials the full telephone dialing number of messaging centre MCC 114 on telephone B which causes a message retrieval request message in the form of a signaling message to be transmitted into telecommunications network 1. The message retrieval request message is intercepted by softswitch 120 which serves telephone B, as shown in step 7a. The message retrieval request message of step 7a contains a CLI for telephone B (denoted CLI: B) and a destination dialing number for messaging centre MCC (denoted DN: MCC). Softswitch 120 then alters signaling information in order to modify CLI information contained in the request message to identify the telephone service associated with telephone C (denoted CLI: C) instead of that associated with telephone B.

Data associated with CLIs for multi-service users may be stored in database 124 in conjunction with the telephony party identifiers associated with each of the multi-service user's telephony services and their mailbox services. When softswitch 120 receives a message retrieval request message for a multi-service user it accesses CLI data stored in database 124 for use in altering signaling information for such message retrieval request messages.

Softswitch 120 then transmits the message retrieval request message containing the altered signaling information into telecommunications network 1 which is routed to messaging centre MCC 114 according to the destination dialing number now identifying messaging centre MCC 114.

When messaging centre MCC receives the message retrieval request message, it checks the CLI information contained in the request and identifies that it relates to the multi-service user of the telephony service associated with telephone C. Since messaging centre MCC 114 hosts a mailbox service for the multi-service user of telephone C, messaging centre MCC 114 routes the multi-service user to the appropriate mailbox. The multi-service user is then able to retrieve and listen to all messages in their mailbox. The multi-service user may be asked to enter a PIN before retrieval of their messages if such an unauthorised access prevention measure is in place.

If the CLI information in the call had not been modified by softswitch 120 to identify the telephone service associated with telephone C instead of that associated with telephone B, then retrieval of messages from the multi-service user's mailbox may not have been possible. This is because messaging centre MCC would not have recognized the original CLI information identifying the telephony service associated with telephone B as it does not host a mailbox service for telephone B. In such a case, the messaging centre may reject the call outright. Alternatively, the messaging centre may prompt the user for their "mailbox number" (e.g. the telephone dialing number of the line with a mailbox on this system) and then another prompt for the user to enter their PIN. In the former case, access to a mailbox is allowed which would otherwise not be possible. In the latter case, the process is simplified as the message centre will recognize the caller identification information without the inconvenience to the multi-service user of having to enter it in themselves.

In certain embodiments, softswitch 120 also alters signaling information in order to modify redirection information to identify the telephone service associated with telephone C (denoted RN: C in FIG. 7), instead of that associated with telephone B. Softswitch 120 may access database 124 when adding signaling information to a redirection field for such a message retrieval request message.

When messaging centre MCC receives the message retrieval request message, it checks the redirection information contained in the request and identifies that it relates to the multi-service user of the telephony service associated with telephone C, and if so, allows access to the user's mailbox. Examination of the redirection information serves as a check on the source of the access attempt, i.e. a recognized telephony service, as opposed to a telephony service operated by a different service provider.

Examination of the redirection information at the messaging centre can be carried out instead of, or in addition to, the examination of CLI information.

Figure 8:
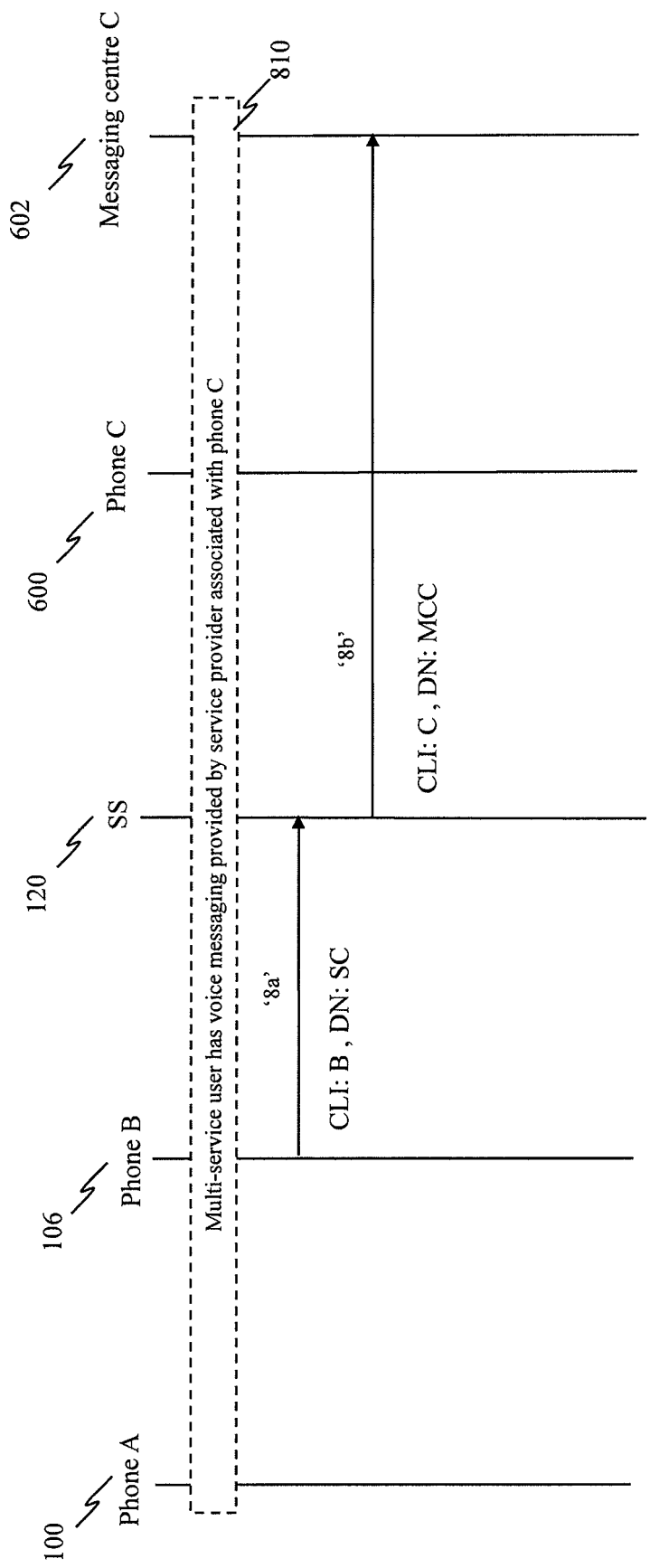
FIG. 8 is a flow diagram according to one or more embodiments.

FIG. 8 is a flow diagram according to a further embodiment of the message retrieval aspect which illustrates a multiservice user of telephones B and C retrieving a voice message from their mailbox provided at messaging centre MCC using telephone B.

To retrieve their voicemail messages, the multi-service user uses telephone B to initiate a call to messaging centre MCC, shown by step 8a. In this embodiment, the multi-service user dials a short code associated with messaging centre MCC on telephone B. Similarly to the embodiment described above in relation to FIG. 7, a message retrieval request message in the form of a signaling message is transmitted into the network and intercepted by softswitch 120, as shown in step 8a.

The message retrieval request message of step 8a contains a CLI for telephone B (denoted CLI: B) and a short code for messaging centre MCC (denoted DN: SC). The message retrieval request message is received at softswitch 120 which alters signaling information in order to modify CLI information contained in the request message to identify the telephone service associated with telephone C (denoted CLI: C) instead of that of telephone B.

Softswitch 120 further alters signaling information in the request message in order to modify destination information contained in the request message. In one arrangement, and since network entities in the telecommunications network other than softswitch 120 may not recognize the short code contained in the message retrieval request message, softswitch 120 replaces the destination information contained in the request message with the full telephone dialing number for messaging centre MCC 114, thereby enabling the destination of the request message to be ascertained elsewhere in the network and the request message to be routed accordingly.

Once the relevant signaling information for the message retrieval request message has been modified, softswitch 120 transmits the message retrieval request message containing the altered signaling information into the network which is routed to messaging centre MCC according to the destination dialing number identifying messaging centre MCC. When messaging centre MCC receives the message retrieval request message, it checks the CLI information contained in the request message and identifies that it relates to the multi-service user of the telephony service associated with telephone C and routes the call to the appropriate mailbox i.e. that associated with telephone C. The multi-service user is then able to retrieve and listen to the messages in their mailbox, possibly after entering a PIN if such an unauthorised access prevention measure is in place.

In an alternative embodiment to that depicted in FIG. 8, softswitch 120 may also alter signaling information in order to modify redirection information to identify the telephone service associated with telephone C, instead of that associated with telephone B. This may be carried out in a similar manner as described above in relation to FIG. 7.

Figure 9:
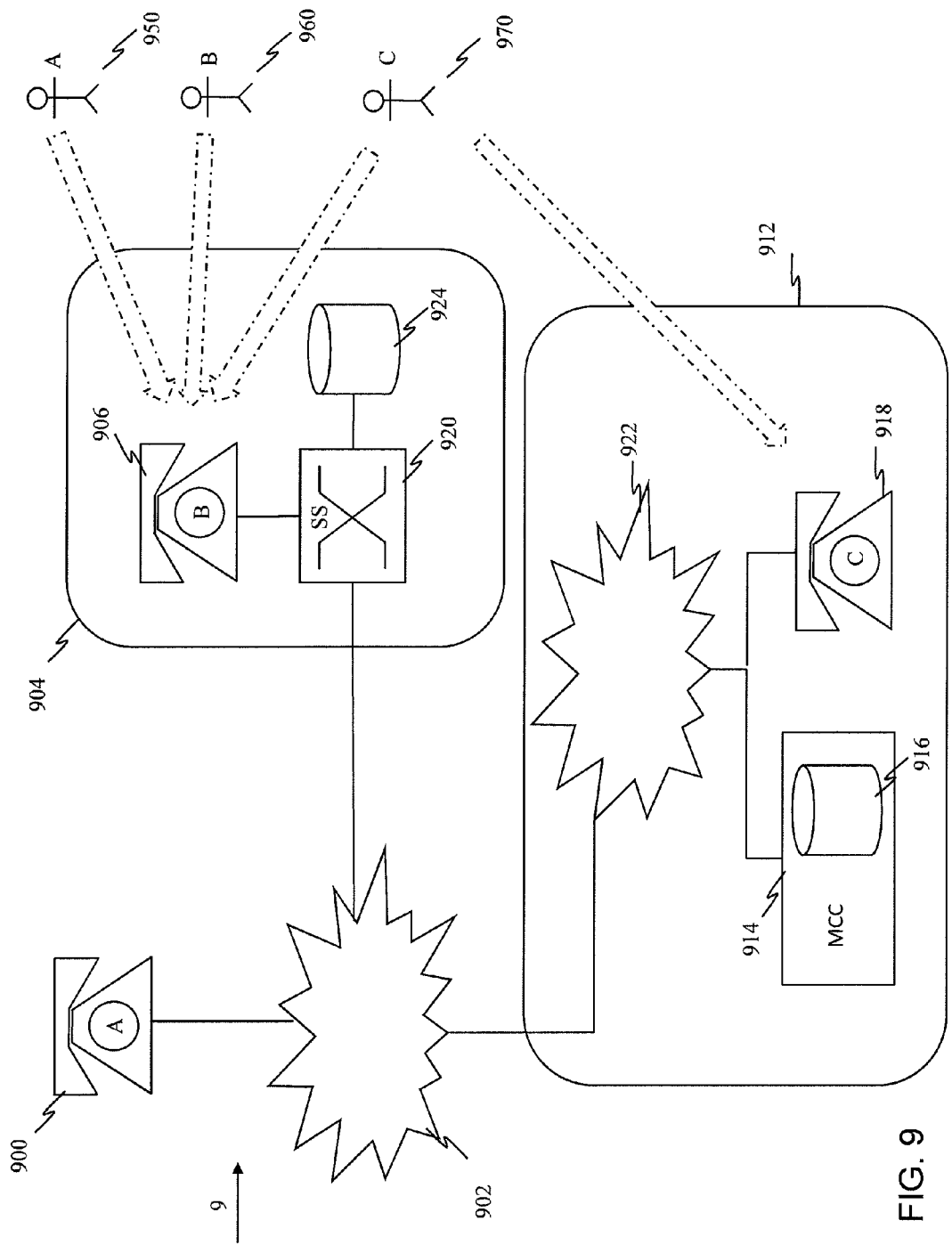
FIG. 9 is a schematic system diagram a according to one ore more embodiments.

FIG. 9 shows a telecommunications network 9 according to one or more embodiments. Telecommunications network 9 includes a PSTN 902 to which a telephone 900 (denoted telephone A) is connected, and which is connected to a first service provider network 904. First service provider network 904 includes a local telephone exchange switch 920 (denoted SS) which serves a telephone 906 (denoted telephone B). Local telephone exchange switch 920 has access to a database 924 located either integral thereto or remotely therefrom. Telecommunications network 9 also includes a second service provider network 912 to which a telephone 918 (denoted telephone C) is connected. Second service provider network 912 includes a messaging centre 914 (denoted MCC) with messaging database 916. Second service provider network 912 interfaces with PSTN 902 via one or more local telephone exchange switches and/or gateways 922.

Telephone B is a shared telephony device to which a number of users 950, 960, 970 (denoted A, B, C respectively) have access, for example a landline telephone located in a common area of a household which may be answered by different members of a family. One of the users of telephone B, user C, is a multi-service user having access to both a telephony service via telephone B and also a telephony service via telephone C. Users A and B are not multi-service users as they only have access to a telephony service via telephone B.

When telephone A is used to make a call to telephone B, the telephone dialing number for telephone B is dialed. This initiates a call that is routed via PSTN 902 to local telephone exchange switch 920 which serves telephone B located in first service provider network 904. The call initiation results in a signaling message traversing PSTN 902. Local telephone exchange switch 920 in first service provider network 904 receives the signaling message, and rings telephone B.

If telephone B is not answered, the calling party (the user of telephone A) is given the option of leaving a message, for example via IVR functionality. If the calling party wishes to leave a message, they enter user selection data, for example by pressing an appropriate key on their telephone. If the calling party selects the multi-service user, then the call can be routed to messaging centre 914 in service provider network 912, whereby the calling party may leave their message at the multi-service user's single mailbox. Alteration and addition of signaling information and routing of the unanswered call to messaging centre 914 is carried out in a similar manner as described above in relation to FIG. 5.

A further embodiment also involves a shared telephony device as depicted in FIG. 9. In this embodiment, the telephone line to the shared telephony device is configured such that calls directed to a first telephony party identifier and also calls directed a third telephony party identifier cause the same shared telephony device to ring. Calls directed to the first telephony party identifier cause the shared telephony device to alert with a different alerting indicator than calls directed to the third telephony party identifier, for example different audible or visual indicators. In this manner, different users having access to the shared telephony device can distinguish which calls are for them and which calls are for other users and thus only answer calls to the shared telephony device which are for them. Such functionality is sometimes referred to as a 'Teen Line' telephony service.

According to the some embodiments, non multi-service users can advertise the first telephony party identifier to their friends and associates, whereas the multi-service user can advertise the third telephony party identifier. When a call to the multi-service user is received (i.e. a call directed to the third telephony party identifier), the shared telephony device will alert with an indicator associated with the multi-service user. If the call is not answered, for example after a predetermined delay, then the unanswered call is routed to messaging centre 914 in service provider network 912 whereby the calling party may leave their message at the multi-service user's single mailbox. Alteration and addition of signaling information and routing of the unanswered call to messaging centre 914 is carried out in a similar manner as described above in relation to FIG. 5. The above embodiments are to be understood as illustrative examples of the invention. Further embodiments of the invention are envisaged.

For example, whilst the above embodiments describe the invention in relation to mailboxes, the other embodiments may also be employed in other service destinations, for example advanced call services applications, either during call setup or after a call has been answered. Such an application may include a method for forwarding calls in a telecommunications network, said method comprising the steps of receiving a call directed to a telephony party identifier associated with a first telephony party; altering first signaling information for said received call so as to modify destination information therein, said modified destination information for said call comprising a telephony party identifier associated with a second telephony party; altering second signaling information for said call so as to modify redirection information therein, said modified redirection information for said call comprising a telephony party identifier associated with a third telephony party; and routing said received call on the basis of said first and second altered signaling information.

The steps of altering the first and second signaling information could be conditionally performed on the basis of a lookup of a subscriber's call forwarding settings.

Embodiments of the present invention could be combined with a single telephone dialing number system where one telephone dialing number is used for multiple telephony services for a user.

Certain embodiments could also be combined with other call processing systems which control how calls are presented to the called party prior to the call being presented to a messaging system.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of routing calls to a single service destination for multi-service users in a telecommunications network, each of the multi-service users having access to a plurality of telephony services including a first telephony service provided in a first service provider network, and a second, different, telephony service provided in a second, different service provider network, the method comprising:
receiving, in the first service provider network, an unanswered call directed to a first telephony party identifier associated with the first telephony service for a user;
altering, in the first service provider network, first signaling information for the received unanswered call so as to modify destination information therein, the modified destination information for the call comprising a telephony party identifier associated with the single service destination, the single service destination being located in the second service provider network;
adding, in the first service provider network, second signaling information for the received unanswered call so as to add a second telephony party identifier therein, the second signaling information for the received unanswered call comprising the second telephony party identifier, different to both the first telephony party identifier and the telephone party identifier associated with the single service destination, the second telephone party identifier being associated with the second telephony service for the user; and
routing the received unanswered call to the single service destination located in the second telephony service network, on the basis of the altered first signaling information, to provide call completion to the single service destination,
wherein the single service destination comprises a mailbox service.

2. The method of claim 1, further comprising:
receiving the routed unanswered call at the single service destination; and
identifying that the added information for the call comprises the telephony party identifier associated with the second telephony service for the user,
wherein the call completion to the single service destination for the user is carried out on the basis of the identification.

3. The method of claim 1, wherein the first telephony service is provided by a first telephony service provider and the second telephony service is provided by a second, different service provider.

4. The method of claim 3, wherein the single service destination is provided to the user by the second telephony service provider.

5. The method of claim 1, wherein the first telephony service and the second telephony service are provided by the same telephony service provider.

6. The method of claim 1, wherein the unanswered call is received at a first network entity associated with the first telephony service and the unanswered call is routed to a second network entity associated with the second telephony service, the second network entity being arranged to provide the single service destination.

7. The method of claim 1, wherein the first telephony service and the second telephony service comprise one or more of a wireline telephony service, a wireless telephony service, and a Voice over Internet Protocol (VoIP) telephone service.

8. The method of claim 1, wherein the telecommunications system comprises a store containing:
a plurality of telephony party identifiers associated with the first telephony service for multi-service users;
a plurality of telephony party identifiers associated with the second telephony service for multi-service users; and
a plurality of telephony party identifiers associated with single service destinations provided by the second telephony service provider,
wherein the method further comprises accessing the store in order to retrieve the telephony party identifier associated with the single service destination and the telephony party identifier associated with the second telephony service, so as to alter the first signaling information and add the second signaling information.

9. The method of claim 8, wherein the accessing of the store comprises accessing data in a database held remote from the multi-service users.

10. The method of claim 1, wherein the telephony party identifiers comprise one or more of a calling party identifier, a network node identifier, a Voice over Internet Protocol (VoIP) identifier, and a Session Initiation Protocol (SIP) identifier.

11. The method of claim 1, wherein the single service destination for the user is accessible by the user via the first telephony service and via the second telephony service.

12. The method of claim 3, wherein the single service destination for the user is accessible by the user via the first telephony service and via the second telephony service.

13. The method of claim 1, wherein the added second signaling information is added to a redirection information field in signaling information for the call.

14. The method of claim 1, further comprising:
intercepting an access call to the single service destination via the first telephony service; and
altering third signaling information in the access call from the first telephony service so as to modify caller identification information therein, the modified caller identification information comprising caller identification information for the user associated with the second telephony service.

15. The method of claim 14, further comprising altering fourth signaling information in the access call from the first telephony service so as to modify destination information therein, the modified destination information for the access call comprising a telephony party identifier associated with the single service destination.

16. The method of claim 15, wherein the destination information before the modification of the access call comprises a short code associated with the single service destination and the destination information after the modification comprises a telephone dialing number for a messaging center node responsible for providing the single service destination.

17. The method of claim 14, further comprising adding fifth signaling information to a redirection field in signaling information for the access call, the fifth signaling information comprising the second telephony party identifier.

18. A method of retrieving messages from a single mailbox provided to a multiservice user in a telecommunications network, the multi-service user having access to a plurality of telephony services including a first telephony service provided in a first service provider network and a second, different, telephony service provided in a second, different service provider network, and to a mailbox service comprising a mailbox for storing one or more messages for the user, the mailbox service being provided by the provider of the second telephony service in the second service provider network, the method comprising:
receiving, in the first service provider network, a message retrieval request message, the message retrieval request message being received from a telephony device associated with the first telephony service, the message retrieval request message comprising caller identification information identifying the user in the first telephony service;
altering, in the first service provider network, first signaling information in the message retrieval request message so as to modify caller identification information therein, the modified caller identification information comprising caller identification information identifying the user in the second telephony service; and
routing the message retrieval request message containing the altered first signaling information to a network node responsible for providing the mailbox service to the user, the network node being located in the second service provider network, to provide message retrieval from the mailbox on the basis of the modified caller information identifying the user in the second telephony service.

19. The method of claim 18, wherein the first telephony service is provided by a first telephony service provider and the second telephony service is provided by a second, different service provider.

20. The method of claim 18, wherein the first telephony service and the second telephony service are provided by the same telephony service provider.

21. The method of claim 18, further comprising:
altering third signaling information in the message retrieval request message so as to modify destination information therein from a short code associated with the mailbox service to a telephone dialing number for the network node,
wherein the routing is carried out on the basis of the altered third signaling information.

22. An apparatus configured to perform the method of claim 1.

23. An apparatus configured to perform the method of claim 14.

24. An apparatus configured to perform the method of claim 18.

25. A non-transient computer-readable medium having computer-executable instructions stored thereon, which, when executed cause a computerized device to perform the method of claim 1.

26. A non-transient computer-readable medium having computer-executable instructions stored thereon, which, when executed cause a computerized device to perform the method of claim 14.

27. A non-transient computer-readable medium having computer-executable instructions stored thereon, which, when executed cause a computerized device to perform the method of claim 18.

* * * * *